United States Patent
Liang et al.

(10) Patent No.: US 11,476,457 B2
(45) Date of Patent: Oct. 18, 2022

(54) NEGATIVE ACTIVE MATERIAL, METHOD FOR PREPARING THE SAME, AND RELATED SECONDARY BATTERY, BATTERY MODULE, BATTERY PACK AND APPARATUS

(71) Applicant: Contemporary Amperex Technology Co., Limited, Ningde (CN)

(72) Inventors: Chengdu Liang, Ningde (CN); Yuzhen Zhao, Ningde (CN); Yingjie Guan, Ningde (CN); Yan Wen, Ningde (CN); Qisen Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/586,754

(22) Filed: Jan. 27, 2022

(65) Prior Publication Data

US 2022/0231279 A1    Jul. 21, 2022

Related U.S. Application Data

(63) Continuation of application No. PCT/CN2020/102062, filed on Jul. 15, 2020.

(30) Foreign Application Priority Data

Jul. 29, 2019   (CN) .......................... 201910687174.2

(51) Int. Cl.
*H01M 4/134*    (2010.01)
*H01M 4/36*    (2006.01)
(Continued)

(52) U.S. Cl.
CPC .......... *H01M 4/366* (2013.01); *H01M 4/134* (2013.01); *H01M 4/386* (2013.01); *H01M 4/387* (2013.01);
(Continued)

(58) Field of Classification Search
None
See application file for complete search history.

(56) References Cited

U.S. PATENT DOCUMENTS

2015/0372292 A1*  12/2015  Yokoi ............... H01M 10/0525
                                                        429/231.8
2019/0074508 A1    3/2019  Ha et al.

FOREIGN PATENT DOCUMENTS

| CN | 1649190 A | 8/2005 |
| CN | 101210119 A | 7/2008 |

(Continued)

OTHER PUBLICATIONS

The extended European search report for EP Application No. 20846942.9, dated Apr. 8, 2022, 5 pages.
(Continued)

*Primary Examiner* — Cynthia K Walls
(74) *Attorney, Agent, or Firm* — East IP P.C.

(57) ABSTRACT

The present application discloses a negative active material, a method for preparing the same, and related secondary batteries, battery modules, battery packs and apparatus. The negative active material includes a core material and a polymer-modified coating layer on at least a part of its surface; the core material includes one or more of silicon-based materials and tin-based materials; the coating layer includes sulfur element and carbon element; in the Raman spectrum of the negative active material, the negative active material has scattering peaks at the Raman shifts of 900 cm$^{-1}$~960 cm$^{-1}$, 1300 cm$^{-1}$~1380 cm$^{-1}$ and 1520 cm$^{-1}$~1590 cm$^{-1}$, respectively, in which the scattering peak at the Raman shift of 900 cm$^{-1}$~960 cm$^{-1}$ has a peak intensity recorded as $I_I$, the scattering peak at the Raman shift of 1520 cm$^{-1}$~1590 cm$^{-1}$ has a peak intensity recorded as $I_G$, and $I_I$ and $I_G$ satisfy $0.2 \leq I_I/I_G \leq 0.8$.

18 Claims, 3 Drawing Sheets

(51) Int. Cl.
*H01M 4/38* (2006.01)
*H01M 4/02* (2006.01)

(52) U.S. Cl.
CPC ............... *H01M 2004/021* (2013.01); *H01M 2004/027* (2013.01); *H01M 2220/20* (2013.01)

(56) References Cited

FOREIGN PATENT DOCUMENTS

| CN | 103456928 A | 12/2013 |
|---|---|---|
| CN | 103988347 A | 8/2014 |
| CN | 104241612 A | 12/2014 |
| CN | 104577050 A | 4/2015 |
| CN | 105226246 A | 1/2016 |
| CN | 105280891 A | 1/2016 |
| CN | 105633368 A | 6/2016 |
| CN | 105895892 A | 8/2016 |
| CN | 107634188 A | 1/2018 |
| CN | 107710465 A | 2/2018 |
| CN | 109103441 A | 12/2018 |
| CN | 109256554 A | 1/2019 |
| CN | 109301184 A | 2/2019 |
| JP | 201384601 A | 5/2013 |
| JP | 201496326 A | 5/2014 |
| JP | 2015144101 A | 8/2015 |
| JP | 2016534494 A | 11/2016 |
| JP | WO2014119238 A1 | 1/2017 |
| JP | 2019119669 A | 7/2019 |

OTHER PUBLICATIONS

PCT International Search Report for PCT/CN2020/102062, dated Oct. 20, 2020, 15 pages.

The First Office Action for China Application No. 201910687174.2, dated Jun. 30, 2021, 8 pages.
Mingyan Feng et al. Preparation and Electrochemical Properties of silicon-based anode Material for Lithium-Ion Batteries "China Excellent Master's Thesis Full-text Database Engineering Science and Technology 1st Series", Mar. 15, 2017(Mar. 15, 2017) The third issue,pp. B020-B127.
Yusen He et al. Ternary Sulfur/Polyacrylonitrile/SiO2 Composite Cathodes for High-Performance Sulfur/Lithium Ion Full Batteries, polymers. Aug. 20, 2018(Aug. 20, 2018) vol. 10, Issue 8.,Literature No. 930.
Heng-Yi Lin et al. Chemical doping of a core-shell silicon nanoparticles@polyaniline nanocomposite for the performance enhancement of a lithium ion battery anode.Nanoscale.Dec. 2, 2015(Dec. 2, 2015) The third issue, pp. 1280-1287, 8 pages.
The Grant Notification for China Application No. 201910687174.2, dated Sep. 28, 2021, 6 pages.
Graphite negative electrode materials for lithium ion battery.GB/T 24533-2009,dated Oct. 30, 2009, 63 pages.
Verification Regulation for Carbon-Sultur Analyzer.JJG 395-1997,dated Sep. 1, 1997, 9 pages.
General rules for X-ray diffractometric analysis.JIS K0131-1996, 30 pages.
Determination of the specific surface area of solids by gas adsorption using the BET method.GB/T 19587-2004,dated Sep. 29, 2004, 15 pages.
Steel and iron—Determination of total carbon and sulfur content Infrared absorption method after combustion in an induction furnace(routine method).GB/T 20123-2006,dated Mar. 2, 2006, 26 pages.
The First Office Action for Japanese Application No. 2021-554734, dated Jun. 14, 2022, 7 pages.
The First Office Action for IN Application No. 202127057120, dated Jun. 2, 2022, 4 pages.

* cited by examiner

NEGATIVE ACTIVE MATERIAL, METHOD FOR PREPARING THE SAME, AND RELATED SECONDARY BATTERY, BATTERY MODULE, BATTERY PACK AND APPARATUS

CROSS-REFERENCE TO RELATED APPLICATION

This application is a continuation of International Application No. PCT/CN2020/102062, filed on Jul. 15, 2020, which claims priority to Chinese Patent Application No. 201910687174.2 entitled "Negative Active Material and Secondary Battery" and filed on Jul. 29, 2019, both of which are incorporated herein by reference in their entireties.

TECHNICAL FIELD

This application belongs to the technical field of energy storage apparatus, and specifically relates to a negative active material, preparation method thereof, and further relates to a secondary battery and related battery module, battery pack and apparatus.

BACKGROUND

With the increasing attention to environmental protection, environmentally friendly secondary batteries are gradually being applied to electric vehicles. Different from secondary batteries used in consumer electronics, power secondary batteries have higher requirements for energy density and cycle life. Compared with traditional carbon materials, silicon-based materials and tin-based materials have a high theoretical gram capacity as negative active materials, which is several times greater than that of graphite-based negative active materials. Therefore, the industry expects to use silicon-based materials to increase the energy density of secondary batteries.

However, the cycle life of silicon-based materials and tin-based materials is poor, resulting in poor cycle performance of the secondary battery in practical use. Therefore, there is a need to provide a negative active material with a longer cycle life under the premise of a higher gram capacity.

SUMMARY

In a first aspect of the present application, a negative active material is provided, including a core material and a polymer-modified coating layer on at least a part of its surface, wherein the core material includes one or more of silicon-based materials and tin-based materials; the coating layer includes sulfur element and carbon element; in a Raman spectrum of the negative active material, the negative active material has scattering peaks at the Raman shifts of 900 cm$^{-1}$~960 cm$^{-1}$, 1300 cm$^{-1}$~1380 cm$^{-1}$ and 1520 cm$^{-1}$~1590 cm$^{-1}$, respectively, in which the scattering peak at the Raman shift of 900 cm$^{-1}$~960 cm$^{-1}$ has a peak intensity recorded as $I_I$, the scattering peak at the Raman shift of 1520 cm$^{-1}$~1590 cm$^{-1}$ has a peak intensity recorded as $I_G$, and $I_I$ and $I_G$ satisfy $0.2 \le I_I/I_G \le 0.8$.

It is surprisingly found that the negative active material provided in the present application includes a core material and a polymer-modified coating layer on at least a part of the surface thereof; the core material includes one or more of silicon-based materials and tin-based materials; the coating layer includes sulfur element and carbon element; in a Raman spectrum of the negative active material, the negative active material has scattering peaks at the Raman shifts of 900 cm$^{-1}$~960 cm$^{-1}$, 1300 cm$^{-1}$~1380 cm$^{-1}$ and 1520 cm$^{-1}$~1590 cm$^{-1}$, respectively, in which the peak intensity of the scattering peak at the Raman shift of 900 cm$^{-1}$~960 cm$^{-1}$ and the peak intensity of the scattering peak at the Raman shift of 1520 cm$^{-1}$~1590 cm$^{-1}$ satisfy the preset relationship, making the negative active material have high ion conductivity and electronic conductivity, thus the initial coulombic efficiency and cycle life of the negative active material are significantly improved, so that the initial coulombic efficiency and cycle performance of the secondary battery are greatly improved.

In any of the foregoing embodiments, the relationship between $I_I$ and $I_G$ may satisfy $0.22 \le I_I/I_G \le 0.6$. The negative active material having the $I_I$ and $I_G$ satisfying the above relationship can further improve the rate performance and cycle life of the battery, and further improve the initial coulombic efficiency of the battery.

In any of the foregoing embodiments, the negative active material has a Raman spectrum comprising a scattering peak at the Raman shift of 1300 cm$^{-1}$~1380 cm$^{-1}$ whose peak intensity is recorded as $I_D$, and $I_D$ and $I_G$ satisfy $1.05 \le I_D/I_G \le 1.50$; optionally, $1.1 \le I_D/I_G \le 1.45$. The $I_D$ and $I_G$ of the negative active material satisfying the above-mentioned relationship can further improve the cycle performance of the secondary battery, and is also conducive to improving the initial coulombic efficiency and energy density of the secondary battery.

In any of the foregoing embodiments, in the Raman spectrum of the negative active material, the full width at half maxima of the scattering peak at the Raman shift of 1300 cm$^{-1}$~1380 cm$^{-1}$ is from 120 cm$^{-1}$ to 160 cm$^{-1}$, optionally from 128 cm$^{-1}$ to 152 cm$^{-1}$. The full width at half maxima of the scattering peak at the Raman shift of 1300 cm$^{-1}$~1380 cm$^{-1}$ in the Raman spectrum of the negative active material which falls within the above range allows further improvement in the cycle performance of the secondary battery.

In any of the foregoing embodiments, a mass percentage of the sulfur element in the negative active material is from 0.5% to 3%, for example from 0.8% to 1.5%. The content of the sulfur element in the negative active material falling within the above range can further improve the cycle performance and energy density of the secondary battery.

In any of the foregoing embodiments, a mass percentage of the carbon element in the negative active material is optionally from 0.1% to 4%, for example from 0.5% to 3%. The content of the carbon element in the negative active material falling within the above range can improve the cycle performance and energy density of the secondary battery.

In any of the foregoing embodiments, the negative active material has an X-ray diffraction pattern including a diffraction peak at the diffraction angle 2θ of 19° to 27° and the diffraction peak has a full width at half maxima of 4° to 12°, and optionally 5° to 10°. The negative active material has a diffraction peak at the position where the 2θ is 19°~27° and the full width at half maxima is within the given range, which can further improve cycle life of the battery.

In any of the foregoing embodiments, the negative active material has a particle size distribution satisfying: $0.5 \le (D_v90-D_v10)/D_v50 \le 2.5$; optionally, $0.8 \le (D_v90-D_v10)/D_v50 \le 2.0$. The particle size distribution of the negative active material falling within the above range can further improve the cycle performance of the battery.

In any of the foregoing embodiments, the negative active material has a volume average particle diameter $D_v50$ of 2 μm-12 μm, optionally 4 μm-8 μm. The $D_v50$ of the negative active material falling within the given range can further improve the cycle performance of the secondary battery, and is also beneficial to increasing the energy density of the secondary battery.

In any of the foregoing embodiments, the negative active material has a specific surface area of 0.5 $m^2/g$ to 5 $m^2/g$, optionally 0.8 $m^2/g$-3 $m^2/g$. The specific surface area of the negative active material falling within the above range can further improve the cycle performance of the secondary battery while meeting the dynamic performance and rate performance requirements of the secondary battery.

In any of the foregoing embodiments, the negative active material has a tap density of 0.8 $g/cm^3$ to 1.3 $g/cm^3$, optionally 0.9 $g/cm^3$ to 1.2 $g/cm^3$. The tap density of the negative active material falling within the given range can increase the energy density of the secondary battery.

In any of the foregoing embodiments, the negative active material has a compacted density of 1.2 $g/cm^3$ to 1.5 $g/cm^3$ measured under a pressure of 5 tons (49 KN), optionally 1.25 $g/cm^3$ to 1.45 $g/cm^3$. The compacted density of the negative active material under a pressure of 5 tons (equivalent to 49 KN) falling within the given range can increase the energy density of the secondary battery.

In any of the foregoing embodiments, the silicon-based material can be selected from one or more of elemental silicon, silicon-oxygen compounds, silicon-carbon composites, silicon-nitrogen compounds, and silicon alloys; optionally, the silicon-based materials s selected from silicon-oxygen compounds; the tin-based material can be selected from one or more of elemental tin, tin-oxygen compounds, and tin alloys. These materials have a higher gram capacity, which enables the secondary battery using them to have a higher energy density.

The second aspect of the present application provides a method for preparing a negative active material, including the following steps:

providing a solution containing a polymer;

mixing a core material with the solution to obtain a mixed slurry, wherein the core material comprises one or more of silicon-based materials and tin-based materials;

drying the mixed slurry under an inert atmosphere to obtain a solid powder;

mixing the solid powder with sulfur powder and performing a heat treatment in an inert atmosphere to obtain a negative active material;

wherein the negative active material includes a core material and a polymer-modified coating layer on at least a part of its surface; the coating layer includes sulfur element and carbon element; in a Raman spectrum of the negative active material, the negative active material has scattering peaks at the Raman shifts of 900 $cm^{-1}$~960 $cm^{-1}$, 1300 $cm^{-1}$~1380 $cm^{-1}$ and 1520 $cm^{-1}$~1590 $cm^{-1}$, respectively, in which the scattering peak at the Raman shift of 900 $cm^{-1}$~960 $cm^{-1}$ has a peak intensity recorded as $I_I$, the scattering peak at the Raman shift of 1520 $cm^{-1}$~1590 $cm^{-1}$ has a peak intensity recorded as $I_G$, and $I_I$ and $I_G$ satisfy $0.2 \leq I_I/I_G \leq 0.8$.

The negative active material obtained by the method provided in the present application includes a core material and a polymer-modified coating layer on at least a part of its surface; the core material includes one or more of silicon-based materials and tin-based materials; the coating layer contains sulfur element and carbon element, and the negative active material has scattering peaks at the Raman shifts of 900 $cm^{-1}$~960 $cm^{-1}$, 1300 $cm^{-1}$~1380 $cm^{-1}$ and 1520 $cm^{-1}$~1590 $cm^{-1}$, respectively, in which the peak intensity of the scattering peak at the Raman shift of 900 $cm^{-1}$~960 $cm^{-1}$ and the peak intensity of the scattering peak at the Raman shift of 1520 $cm^{-1}$~1590 $cm^{-1}$ satisfy a preset relationship, making the negative active material have high ion conductivity and electronic conductivity, thus the initial coulombic efficiency and cycle life of the negative active material are significantly improved, so that the initial coulombic efficiency and cycle performance of the secondary battery are greatly improved.

In any of the foregoing embodiments, the polymer includes one or more of polyaniline, polyacetylene, polyacrylonitrile, polystyrene, polyvinyl chloride, and polyethylene. The coating layer based on the polymer can provide effective protection to the core material and improve the electronic conductivity of the negative active material, thereby helping to improve the cycle performance of the secondary battery.

In any of the foregoing embodiments, in the solution containing a polymer, a ratio of the mass of the polymer to the volume of the solvent is from 0.1 g/L to 10 g/L, optionally from 1 g/L to 5 g/L. The appropriate amount of polymer added is beneficial to improving the particle size distribution of the negative active material, wherein the $D_v10$, $D_v50$ and $D_v90$ of the negative active material can be made within an appropriate range, thereby improving the energy density and cycle performance of the secondary battery.

In any of the foregoing embodiments, the mass ratio of the core material to the polymer in the mixed slurry is from 10 to 200; optionally, the mass ratio of the core material to the polymer in the mixed slurry is from 20 to 100. The mass ratio of the core material and the polymer is in an appropriate range, which is beneficial for the secondary battery to have higher energy density and cycle performance.

In any of the foregoing embodiments, the step of mixing the solid powder and the sulfur powder satisfies: the ratio of the mass of the sulfur powder to the mass of the polymer in the solid powder is from 1 to 5; optionally, the ratio of the mass of the sulfur powder to the mass of the polymer in the solid powder is from 2 to 4. The mass ratio of the sulfur powder to the polymer is within the above range, which is beneficial for the secondary battery to have higher cycle performance.

In any of the foregoing embodiments, the heat-treatment temperature is from 200° C. to 450° C.; optionally, the heat-treatment temperature is from 300° C. to 450° C. The heat-treatment temperature within the above range can improve the cycle performance of the secondary battery.

In any of the foregoing embodiments, the heat-treatment time is from 2 h to 8 h; optionally, the heat-treatment time is from 3 h to 5 h.

In a third aspect of the present application, a secondary battery is provided, which including the negative active material according to the first aspect of the present application or the negative active material obtained by the method according to the second aspect of the present application.

The secondary battery of the present application have high energy density, high initial coulombic efficiency and long cycle performance since it adopts the negative active material of the present application.

In a fourth aspect of the present application, a battery module is provided, which includes the secondary battery according to the third aspect of the present application.

In a fifth aspect of the present application, a battery pack is provided, which includes the battery module according to the fourth aspect of the present application.

In a sixth aspect of the present application, an apparatus is provided, which includes at least one of the secondary battery according to the third aspect of the present application, the battery module according to the fourth aspect of the present application, or the battery pack according to the fifth aspect of the present application.

The battery module, battery pack and apparatus of the present application includes the secondary battery according to the present application, thus has at least the same or similar technical effect as the secondary battery.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Negative Active Material

Figure 1:
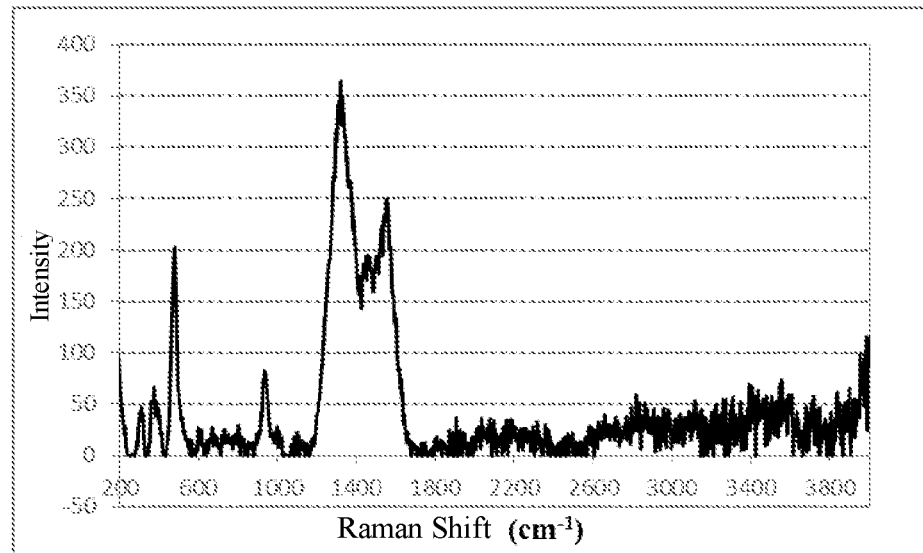
FIG. 1 is a Raman spectrum of a negative active material according to the present application.

In an aspect of the present application, a negative active material is provided, comprising a core material and a polymer-modified coating layer on at least a part of its surface, wherein the core material comprises one or more of silicon-based materials and tin-based materials; the coating layer comprises sulfur element and carbon element; in a Raman spectrum of the negative active material, the negative active material has scattering peaks at the Raman shifts of 900 $cm^{-1}$~960 $cm^{-1}$, 1300 $cm^{-1}$~1380 $cm^{-1}$ and 1520 $cm^{-1}$~1590 $cm^{-1}$, respectively (as shown in FIG. 1), in which the scattering peak at the Raman shift of 900 $cm^{-1}$~960 $cm^{-1}$ has a peak intensity recorded as $I_I$, the scattering peak at the Raman shift of 1520 $cm^{-1}$~1590 $cm^{-1}$ has a peak intensity recorded as $I_G$, and $I_I$ and $I_G$ satisfy $0.2 \leq I_I/I_G \leq 0.8$.

In the negative active material of the present application, a polymer modified coating layer is coated on at least a part of the outer surface of the core material, which has a good protective effect on the core material, inhibits the side reaction of the electrolyte on the surface of the core material, and ensures the negative active material to have high capacity and cycle life.

In addition, in the Raman spectrum of the negative active material, the scattering peak of the negative active material at the Raman shift of 900 $cm^{-1}$~960 $cm^{-1}$ is attributed to the S—S bond (hereinafter referred to as the S—S peak), making the coating layer have higher active ion conductivity; there is a D-band scattering peak of carbon (hereinafter referred to as D peak) at the Raman shift of 1300 $cm^{-1}$~1380 $cm^{-1}$, and there is a G-band scattering peak of carbon (hereinafter referred to as G peak) at the Raman shift of 1520 $cm^{-1}$~1590 $cm^{-1}$, so that the coating layer has higher electronic conductivity. During the battery charging process, the S—S bond breaks and combines with active ions to carry out ion migration and has a high migration rate. During battery discharging process, the active ions are released, and the S—S bonds are re-bonded. During battery charging and discharging process, only the breaking and bonding of S—S bonds occur in the process, and the structure of the carbon-based skeleton remains unchanged, which ensures the protective effect of the coating layer on the silicon-oxygen compound.

In particular, in the Raman spectrum of the negative active material, the peak intensity $I_I$ of the S—S peak and the peak intensity $I_G$ of the G peak satisfy $0.2 \leq I_I/I_G \leq 0.8$. The inventors found that the peak intensity of the S—S peak and the peak intensity of the G peak satisfy the above-mentioned preset relationship, and the ion conductive performance and the conductive electron performance of the negative active material are greatly improved. As a result, the negative active material has high conductivity of active ions and electrons, which is beneficial to the capacity of the negative active material and the capacity retention rate during cycle, and can also reduce the polarization of the battery and reduce the irreversible capacity of the battery, Thereby the initial coulombic efficiency and cycle performance of the secondary battery are significantly improved.

Therefore, the use of the negative active material of the present application enables the secondary battery to simultaneously have higher initial coulombic efficiency, cycle performance, and energy density.

In the negative active material of the present application, the core material comprises one or more of silicon-based materials and tin-based materials.

Optionally, the silicon-based material is selected from one or more of elemental silicon, silicon-oxygen compounds, silicon-carbon composites, silicon-nitrogen compounds, and silicon alloys. For example, the silicon-based material is selected from silicon-oxygen compounds. Among them, the theoretical gram capacity of the silicon-oxygen compound is about 7 times greater than that of graphite, and compared with the elemental silicon, the volume expansion during charging is greatly reduced, and the cycle stability of the battery is greatly improved.

Optionally, the tin-based material may be selected from one or more of elemental tin, tin oxide compounds, and tin alloys.

In the negative active material of the present application, the ratio $I_I/I_G$ of the peak intensity $I_I$ of the S—S peak to the peak intensity $I_G$ of the G peak may be $\leq 0.8$, $\leq 0.75$, $\leq 0.7$, $\leq 0.65$, $\leq 0.6$, $\leq 0.55$, or $\leq 0.5$. $I_I/I_G$ may be $\geq 0.4$, $\geq 0.35$, $\geq 0.3$, $\geq 0.25$, $\geq 0.22$, or $\geq 0.2$.

Optionally, the negative active material satisfies $0.22 \leq I_I/I_G \leq 0.6$; for example, $0.25 \leq I_I/I_G \leq 0.53$, or $0.25 \leq I_I/I_G \leq 0.42$, etc. The peak intensity of the S—S peak and the peak intensity of the G peak satisfying the above relationship can make the coating layer have better active ion conductivity and electronic conductivity, thereby further improving the rate performance and charge-discharge cycle life of the battery, and further improving the initial Coulomb efficiency of the battery.

In some embodiments, in the Raman spectrum of the negative active material, the ratio of the peak intensity $I_D$ of the D peak to the peak intensity $I_G$ of the G peak may satisfy $1.05 \leq I_D/I_G \leq 1.50$.

Optionally, for the negative active material of the present application, $I_D/I_G$ may be $\leq 1.50$, $\leq 1.48$, $\leq 1.45$, $\leq 1.42$, $\leq 1.40$, $\leq 1.37$, $\leq 1.35$, $\leq 1.33$, or $\leq 1.30$. $I_D/I_G$ may be $\geq 1.28$, $\geq 1.25$, $\geq 1.23$, $\geq 1.20$, $\geq 1.18$, $\geq 1.15$, $\geq 1.12$, $\geq 1.10$, $\geq 1.08$, or $\geq 1.05$. Optionally, $1.1 \leq I_D/I_G \leq 1.45$; or, $1.2 \leq I_D/I_G \leq 1.39$, etc.

The ratio of the peak intensity $I_D$ of the D peak to the peak intensity $I_G$ of G peak within the above range can reduce the irreversible capacity of the material during charge and discharge cycles, while ensuring that the coating layer has excellent electrical conductivity, which is conducive to the capacity of the material capacity. It can improve the cycle capacity retention rate of the material, thereby improving the initial coulombic efficiency, cycle performance and energy density of the secondary battery.

In some embodiments, for the negative active material of the present application, a full width at half maxima of the D peak is from 120 cm$^{-1}$ to 160 cm$^{-1}$, optionally from 128 cm$^{-1}$ to 152 cm$^{-1}$.

In the context, the full width at half maxima, also known as the half-height width, refers to the peak width at half the peak height.

In the Raman spectrum of the negative active material, the full width at half maxima of the D peak can be selected to be more than or equal to 120 cm$^{-1}$, for example, more than or equal to 128 cm$^{-1}$, which can further improve the elasticity and toughness of the coating layer and make the coating layer better adapt to the expansion and contraction of silicon-oxygen compound during charge and discharge without cracking. The full width at half maxima of the D peak can be selected to be less than or equal to 160 cm$^{-1}$, for example, less than or equal to 152 cm$^{-1}$, which can ensure that the coating layer has higher conductivity and further improve the cycle performance of the secondary battery.

Figure 2:
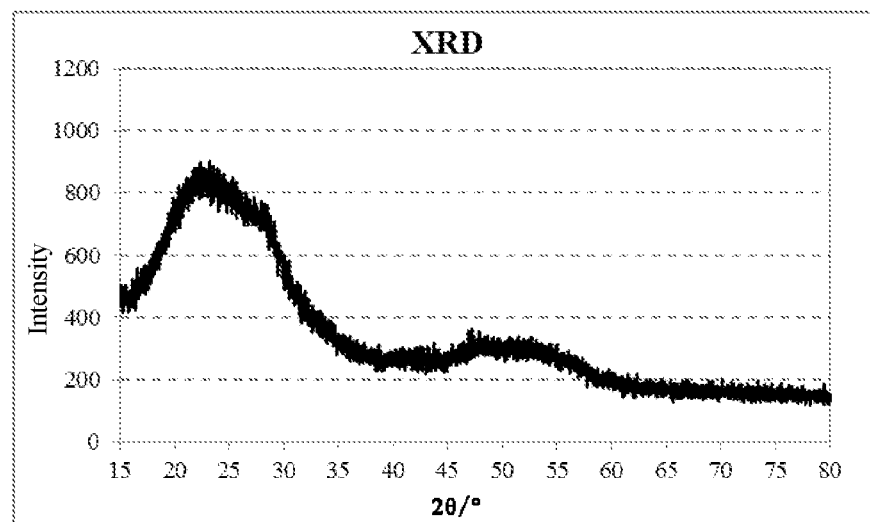
FIG. 2 is an X-ray diffraction (XRD) diagram of a negative active material according to the present application.

In some embodiments, optionally, in the X-ray diffraction spectrum of the negative active material, the negative active material has diffraction peaks in the position of 19°~27° for 2θ (referring to FIG. 2), and the full width at half maxima of the diffraction peak is optionally from 4° to 12°, for example, from 5° to 10°. The negative active material with diffraction peaks in the position of 19°~27° for 2θ and the full width at half maxima within the given range has higher gram capacity and lower cycle expansion, which is not easy to crack or pulverize during the charge and discharge cycle of the secondary battery, so the cycle life of the battery can be further improved.

In some embodiments, a content of sulfur element in the negative active material may be from 0.5% to 3% by mass, for example, from 0.8% to 1.5% by mass.

The content of sulfur element in the negative active material may be selected to be 0.5% or more, for example, 0.8% or more, which can further increase the content S—S groups in the coating layer, further improve the active ion conduction rate of the coating layer, and reduce battery polarization. The content of sulfur element may be selected to be 3% or less, for example 1.5% or less. On the one hand, the coating layer has higher ion conductivity, and it also has a lower thickness to further reduce the material capacity loss caused by the increase of the coating layer's content. On the other hand, the residual elemental sulfur in the material is avoided, so as to further reduce the material capacity loss caused by the completely irreversible reaction between elemental sulfur and active ions. Therefore, the content of sulfur element in the negative active material is within the above range, which can further improve the cycle performance and energy density of the secondary battery.

In some embodiments, a content of carbon element in the negative active material may be from 0.1% to 4% by mass, for example, from 0.5% to 3% by mass. The content of carbon element in the negative active material is within the above range, which is beneficial to making the coating layer have higher electronic conductivity, and can also make the coating layer have better elasticity and toughness, and better protect the silicon-oxygen compound, thus further improving the cycle performance and energy density of the secondary battery.

In some embodiments, optionally, a coating layer is provided on the entire outer surface of the silicon-oxygen compound. This can further improve the initial coulombic efficiency and cycle performance of the battery.

In some embodiments, the particle size $D_v10$, $D_v50$ and $D_v90$ of the negative active material satisfy: $0.5 \leq (Dv90-Dv10)/Dv50 \leq 2.5$. The negative active material having the particle size distribution falling within the above range can reduce the side reaction on the negative electrode film and reduce consumption of the electrolytic solution, and also is conducive to preventing particles from cracking or pulverizing during charge and discharge and improving the structural stability of the material, thereby further improving the cycle performance of the secondary battery.

Optionally, the particle size $D_v10$, $D_v50$ and $D_v90$ of the negative active material satisfy $0.8 \leq (D_v90-D_v10)/D_v50 \leq 2.0$, for example $1.02 \leq (D_v90-D_v10)/D_v50 \leq 1.48$, or $1.16 \leq (D_v90-D_v10)/D_v50 \leq 1.48$ etc.

In some embodiments, the average particle size $D_v50$ of the negative active material may be selected to be from 2 μm to 12 μm, for example from 4 μm to 8 μm, from 4 μm to 6.4 μm, or from 5.9 μm to 6.3 μm.

The $D_v50$ of the negative active material may be selected to be 2 μm or more, for example, 4 μm or more, which can reduce the film-forming consumption of active ions on the negative electrode, and reduce the side reaction of the electrolyte on the negative electrode, thereby reducing the irreversible capacity of the secondary battery and improving the cycle performance of the secondary battery. The $D_v50$ of the negative active material may be selected to be 2 μm or more, for example, 4 μm or more, which can also reduce the amount of binder in the negative electrode, thereby it is beneficial to improving the energy density of the secondary battery.

The $D_v50$ of the negative active material may be selected to be 12 μm or less, for example, 8 μm or less, which is beneficial to increasing the conductivity of active ions and electrons, and also is beneficial to preventing particles from cracking or pulverizing during charge and discharge, thereby improving the cycle performance of the secondary battery.

In some embodiments, the specific surface area of the negative active material may be from 0.5 m$^2$/g to 5 m$^2$/g, for example, from 0.8 m$^2$/g to 3 m$^2$/g, from 1.07 m$^2$/g to 3 m$^2$/g, or from 2.57 m$^2$/g to 3 m$^2$/g, etc.

The specific surface area of the negative active material may optionally be 0.5 m$^2$/g or more, for example, 0.8 m$^2$/g or more, thus the surface of the material has more active sites, which can improve the electrochemical performance of the material and meet the requirements of the secondary battery for dynamic performance and rate performance. The specific surface area of the negative active material may optionally be 5 m$^2$/g or less, for example, 3 m$^2$/g or less, which is beneficial to reducing the side reaction of the electrolyte on the negative electrode, and can also reduce the film-forming consumption of active ions on the negative electrode, thereby improving the cycle performance of battery.

In some embodiments, the tap density of the negative active material may optionally be from 0.8 g/cm$^3$ to 1.3 g/cm$^3$, for example, from 0.9 g/cm$^3$ to 1.2 g/cm$^3$, etc. The tap density of the negative active material is within the given range, which is beneficial to increasing the energy density of the secondary battery.

In some embodiments the negative active material has a compacted density of 1.2 g/cm$^3$ to 1.5 g/cm$^3$, for example, from 1.25 g/cm$^3$ to 1.45 g/cm$^3$, measured under a pressure of 5 tons (equivalent to 49 KN). The compacted density of the negative active material measured after keeping the material at a pressure of 5 tons (equivalent to 49 KN) for 30 seconds and then releasing the pressure is within the given range, which is beneficial to increasing the energy density of the secondary battery.

In the present application, the Raman spectrum of the negative active material can be measured by instruments and methods known in the art. For example, a Raman spectrometer is used, as a specific example, LabRAM HR Evolution laser microscopic Raman spectrometer. The peak intensity of the negative active material in a certain Raman shift range refers to the maximum value of the intensity value in the Raman shift range of the Raman spectrum.

In the present application, the X-ray diffraction spectrum of the negative active material can be measured by instruments and methods known in the art. For example, an X-ray diffractometer is used to measure the X-ray diffraction spectrum in accordance with JIS K0131-1996 X-ray (General rules for X-ray diffractometric analysis). For example, a Bruker D8 Discover X-ray diffractometer is used, CuK$_\alpha$ rays is used as the radiation source, the ray wavenumber is λ=1.5406 Å, the scanning angle range for 2θ is 15°~80°, and the scanning rate is 4°/min.

In the present application, the content of sulfur and carbon elements in the negative active material can be determined by using instruments and methods known in the art. For example, HCS-140 type infrared carbon and sulfur analyzer from Shanghai Dekai Instrument Co., Ltd. is used for testing in accordance with the measurement method of GB/T 20123-2006/ISO 15350:2000, and the detection precision meets the standard of Metrological Verification Regulation JJG 395-1997.

In the present application, $D_v10$, $D_v50$, and $D_v90$ of the negative active material have the meanings well known in the art, and can be measured with instruments and methods known in the art, for example, with a laser particle size analyzer, such as Mastersizer 3000 laser particle size analyzer from Malvern Instruments Co., Ltd., UK.

In the context, the physical definitions of $D_v10$, $D_v50$ and $D_v90$ are as follows:

$D_v10$=the particle size when the cumulative volume distribution percentage of the material reaches 10%;

$D_v50$=the particle size when the cumulative volume distribution percentage of the material reaches 50%;

$D_v90$=the particle size when the cumulative volume distribution percentage of the material reaches 90%.

In the present application, the specific surface area of the negative active material has a meaning known in the art, and can be measured with instruments and methods known in the art. For example, the specific surface area may be measured with nitrogen adsorption specific surface area analysis with reference to GB/T 19587-2004 (Determination of the specific surface area of solids by gas adsorption using the BET method), and calculated by the BET (Brunauer Emmett Teller) method, in which the nitrogen adsorption specific surface area analysis can be carried out by a specific surface and pore size distribution analyzer of Type: Tri Star II 3020 from Micromeritics, USA.

In the present application, the tap density of the negative active material is a well-known meaning in the art, and it can be measured with a well-known instrument and method in the art, for example, it can be conveniently measured with a tap density meter, and for example, the BT-300 type tap density tester.

In the present application, the compacted density of the negative active material a well-known meaning in the art and can be measured with instruments and methods known in the art. For example, with reference to GB/T24533-2009 standard, it can be measured by an electronic pressure tester, such as UTM7305 electronic pressure tester. About 1 g of the sample is accurately weighed, added to a mold with a bottom area of 1.327 cm$^2$, applied a pressure of 5 tons (corresponding to 49 KN) and kept under this pressure for 30 seconds; then the pressure is released and kept for 10 seconds, and then the compacted density of the negative active material is recorded and calculated.

Next, a method for preparing the negative active material is provided, by which the negative active material of the present application can be prepared.

As a specific example, the method for preparing the negative active material includes the following steps:

S10: providing a solution containing a polymer;

S20: mixing a core material with the solution to obtain a mixed slurry;

S30: drying the mixed slurry under an inert atmosphere to obtain a solid powder;

S40: mixing the solid powder with sulfur powder and performing a heat treatment in an inert atmosphere to obtain the negative active material.

In step S10, the polymer may be selected from one or more of polyaniline (abbreviated as PANI), polyacetylene (abbreviated as PA), polyacrylonitrile (abbreviated as PAN), and polystyrene (abbreviated as PS), polyvinyl chloride (abbreviated as PVC) and polyethylene (PE for abbreviation). The coating layer based on such polymer has good comprehensive properties, including good strength, elasticity and toughness, and good electrical conductivity. Therefore, the coating layer can provide effective protection to the core material and improve the electron conductivity of the negative active material, which is conducive to improving the cycle performance of the battery.

There is no particular limitation on the type of solvent in step S10. Optionally, the solvent is selected from one or more of N-Methyl pyrrolidone (abbreviated as NMP), dimethylbenzene (abbreviated as DMB), methylbenzene (abbreviated as MB) and N,N-dmethylformamide (abbreviated as DMF).

In step S10, optionally, the ratio of the mass of the polymer to the volume of the solvent is from 0.1 g/L to 10 g/L. For example, the ratio of polymer mass to solvent volume is 1 g/L~5 g/L, 1.5 g/L~6.5 g/L, 2.5 g/L~5.5 g/L, or 2.5 g/L~4 g/L, etc.

In step S20, a core material with a desired particle size distribution can be commercially available; or the core material can be crushed to obtain a core material with a certain particle size distribution.

In step S20, optionally, the mass ratio of the core material to the polymer is from 10 to 200, such as from 20 to 100, from 15 to 70, from 18 to 50, or from 25 to 40. The higher the mass content of the polymer is, the higher the content of carbon element in the coating layer of the negative active material will be. The mass ratio of the core material to the polymer is within the above range, ensuring the protective effect of the coating layer on the core material, it can also effectively prevent agglomeration of the negative active material during the preparation process, and is beneficial to making the material have high active ion conductivity during discharge.

In step S30, an equipment and a method known in the art may be used to dry the mixed slurry, such as vacuum drying, airflow drying, spray drying, and the like. As an example, step S30 may be performed by a wet coating machine.

Optionally, the temperature at which the mixed slurry is dried in an inert atmosphere is from 80° C. to 300° C., for example, from 110° C. to 250° C., or from 180° C. to 230° C., etc. The heating rate may be selected from 1° C./min to 10° C./min, for example, from 1° C./min to 5° C./min.

In step S30, the inert atmosphere may be selected from one or more of nitrogen, argon and helium.

In step S40, the sulfur powder and the polymer undergo a cross-linking reaction under an inert atmosphere to improve the elasticity and toughness of the coating layer, and at the same time improve the ion conductivity of the coating layer, thereby improving the cycle performance of the battery.

Optionally, the mass ratio of sulfur powder to polymer is from 1 to 5, such as from 1.6 to 4, from 2 to 4, or from 2 to 3, etc. The mass ratio of sulfur powder to polymer is within the above range, which is beneficial to making the coating layer of the negative active material have higher electronic conductivity and active ion conductivity at the same time, and to avoiding the presence of elemental sulfur residues in the coating layer, thus effectively preventing the capacity loss caused by the irreversible reaction between residual elemental sulfur and active ions, thereby helping to ensure that the battery has a higher cycle performance.

In addition, the mass ratio of the sulfur powder to the polymer is within the above range, so that the sulfur powder can fully crosslink the polymer and improve the elasticity and toughness of the coating layer.

In step S40, optionally, the temperature at which the mixture of solid powder and sulfur powder is heat-treated in an inert atmosphere is from 200° C. to 450° C., for example, from 300° C. to 450° C., from 350° C. to 450° C., or from 400° C. to 450° C. ° C. etc. The heat-treatment temperature within the above range can ensure that the coating layer will not be completely carbonized, which is beneficial to further improving the elasticity and toughness of the coating layer, so as to better adapt to the expansion and contraction of the silicon-oxygen compound during the charging and discharging process; and the obtained coating layer can effectively isolate the silicon-oxygen compound from the electrolyte and reduce side reactions. Therefore, it is possible to improve the cycle performance of the battery.

Optionally, the heat-treatment time is from 2 h to 8 h, for example, 2 h~5 h, 2 h~4 h, 2 h~3 h, or 3 h~5 h, etc.

In step S40, the inert atmosphere may be selected from one or more of nitrogen, argon and helium.

Secondary Battery

Another aspect of the present application provides a secondary battery comprising a positive electrode plate, a negative electrode plate, a separator, and an electrolyte. The negative electrode comprises a negative current collector and a negative electrode film disposed on at least one surface of the negative current collector, wherein the negative electrode film comprises a negative active substance, and the negative active substance comprises the negative active material according to the first aspect of the present application.

Since the secondary battery of the present application adopts the negative active material of the present application, it can simultaneously have high initial coulombic efficiency, cycle performance, and energy density.

For the secondary battery of the present application, the negative electrode current collector is made of a material with good conductivity and mechanical strength, such as copper foil.

For the secondary battery of the present application, the negative active substance may further comprise a carbon material, and the carbon material is selected from one or more of artificial graphite, natural graphite, mesocarbon microspheres (MCMB), hard carbon, and soft carbon. Optionally, the carbon material is selected from one or more of artificial graphite and natural graphite.

For the secondary battery of the present application, the negative electrode film may optionally comprise a conductive agent, a binder, and a thickener, and there is no specific limitation on their types, and those skilled in the art can make selections according to actual needs.

Optionally, the conductive agent may be one or more of graphite, superconducting carbon, acetylene black, carbon black, Ketjen black, carbon dots, carbon nanotubes, graphene, and carbon nanofibers.

Optionally, the binder may be one or more of polyacrylic acid (PAA), sodium polyacrylate (PAAS), polyvinyl alcohol (PVA), styrene butadiene rubber (SBR), sodium carboxymethyl cellulose (CMC-Na), sodium alginate (SA), polymethacrylic acid (PMAA) and carboxymethyl chitosan (CMCS).

Optionally, the thickener may be sodium carboxymethyl cellulose (CMC-Na).

The negative electrode plate can be prepared according to conventional methods in the art such as a coating method. For example, the negative active material and optional conductive agent, binder and thickener are dispersed in a solvent which can be deionized water to form a uniform negative electrode slurry. The negative electrode current collector is coated with the negative electrode slurry. After being dried, cold pressed and other processes, a negative electrode plate is obtained.

For the secondary battery of the present application, the positive electrode plate comprises a positive electrode current collector and a positive electrode film disposed on at least one surface of the positive electrode current collector and comprising a positive active substance. The type of the positive active substance is not specifically limited, and materials useful for the secondary battery and known in the art can be used, and those skilled in the art can make selections according to actual needs.

Optionally, the positive active substance may be selected from one or more of lithium cobalt oxide, lithium nickel oxide, lithium manganese oxide, lithium nickel manganese oxide, lithium nickel cobalt manganese oxide, lithium nickel cobalt aluminum oxide and lithium containing phosphate with olivine structure.

For the secondary battery of the present application, the positive electrode current collector can be made of materials with good electrical conductivity and mechanical strength, such as aluminum foil.

For the secondary battery of the present application, the positive electrode film may optionally comprise a binder and/or a conductive agent. The types of the binder and the conductive agent are not specifically limited, and those skilled in the art can make selections according to actual needs.

Optionally, the binder may be selected from one or more of polyvinylidene fluoride (PVDF) and polytetrafluoroethylene (PTFE).

Optionally, the conductive agent may be selected from one or more of graphite, superconducting carbon, acetylene black, carbon black, Ketjen black, carbon dots, carbon nanotubes, graphene, and carbon nanofibers.

The above-mentioned positive electrode plate can be prepared according to conventional methods in the art such as a coating method. For example, the positive active substance and optionally conductive agent and binder are dispersed in a solvent (such as N-methylpyrrolidone), to form a uniform positive electrode slurry, and the positive electrode slurry is coated on the positive electrode current collector. After being dried, cold pressed and other processes, the positive electrode plate is obtained.

For the secondary battery of the present application, the electrolyte may be selected from at least one of solid electrolyte and liquid electrolyte (i.e. an electrolytic solution). The electrolyte salt containing active ions may be dispersed in an organic solvent to form the electrolyte solution. There is no particular limitation to the specific types of electrolyte salt and solvent, which can be selected according to actual needs.

Optionally, the electrolyte salt may be selected from one or more of $LiPF_6$ (lithium hexafluorophosphate), LiBF4 (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate).

Optionally, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

For the secondary battery of the present application, the electrolytic solution may optionally comprise an additive. The additive is not particularly limited and can be selected according to requirements. For example, the additives may comprise one or more of negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

For the secondary battery of the present application, the separator is disposed between the positive electrode plate and the negative electrode plate to isolate them. The separator is not particularly limited, and any well-known porous structure separator having chemical stability and mechanical stability can be selected, such as one or more of glass fiber, non-woven fabric, polyethylene, polypropylene and polyvinylidene fluoride. The separator can be a single-layer film or a multilayer composite film. When the separator is a multilayer composite film, the materials of each layer may be the same or different.

The secondary battery can be prepared by a method commonly known in the art. As an example, a positive electrode plate, a separator, and a negative electrode plate are wound (or stacked) in order, so that the separator is located between the positive electrode plate and the negative electrode plate to act as isolation, thereby obtaining an electrode component. The electrode component is placed in a packaging case, and then an electrolytic solution is injected therein and sealed to obtain a secondary battery.

Figure 3:
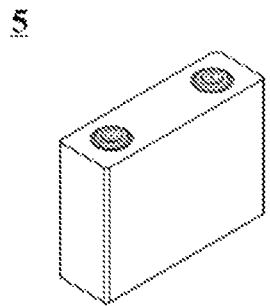
FIG. 3 is a perspective view of a secondary battery according to an embodiment of the present application.

The present application has no particular limitation on the shape of the secondary battery, which may be cylindrical, square or any other shapes. FIG. 3 shows a secondary battery with a square structure as an example.

In some embodiments, the secondary battery may comprise an outer package. The outer package is used to package the positive electrode plate, the negative electrode plate and the electrolyte.

Figure 4:
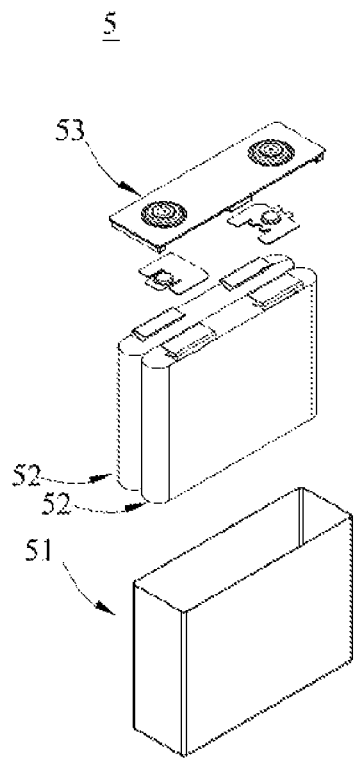
FIG. 4 is an exploded view of FIG. 3.

In some embodiments, referring to FIG. 4, the outer package may comprise a housing 51 and a cover 53, wherein the housing 51 may comprise a bottom plate and a side plate connected to the bottom plate, and the bottom plate and the side plate enclose a receiving cavity. The housing 51 has an opening communicating with the receiving cavity, and the cover plate 53 can cover the opening to close the receiving cavity.

A positive electrode plate, a negative electrode plate and a separator may be formed into an electrode assembly 52 through a winding process or a lamination process. The electrode assembly 52 is packaged in the receiving cavity. The electrolyte which can be an electrolytic solution is infiltrated in the electrode assembly 52. The number of electrode assemblies 52 contained in the secondary battery 5 can be one or more, which can be adjusted according to requirements.

In some embodiments, the outer package of the secondary battery may be a hard case, such as a hard plastic case, an aluminum case, a steel case. The outer package of the secondary battery may also be a soft bag, such as a pouch type soft bag. The material of the soft bag can be plastic, for example, it can comprise one or more of polypropylene (PP), polybutylene terephthalate (PBT), polybutylene succinate (PBS).

In some embodiments, the secondary battery can be assembled to form a battery module. The number of secondary batteries contained in the battery module can be multiple, and the specific number can be adjusted according to the application and capacity of the battery module.

Figure 5:
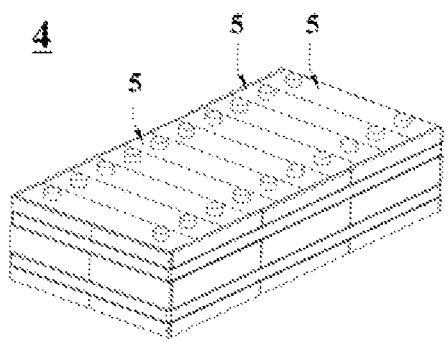
FIG. 5 is a perspective view of a battery module according to an embodiment of the present application.

FIG. 5 is a battery module 4 as an example. Referring to FIG. 5, in the battery module 4, a plurality of secondary batteries 5 may be arranged in sequence along the length direction of the battery module 4. Of course, it can also be arranged in any other manner. Further, the plurality of secondary batteries 5 can be fixed by fasteners.

Optionally, the battery module 4 may further comprise a housing with a receiving space, and a plurality of secondary batteries 5 are accommodated in the receiving space.

In some embodiments, the above-mentioned battery module can further be assembled into a battery pack. The number of battery modules contained in the battery pack can be adjusted according to the application and capacity of the battery pack.

Figure 6:
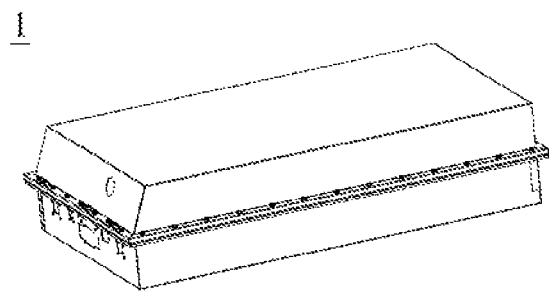
FIG. 6 is a perspective view of a battery pack according to an embodiment of the present application.
Figure 7:
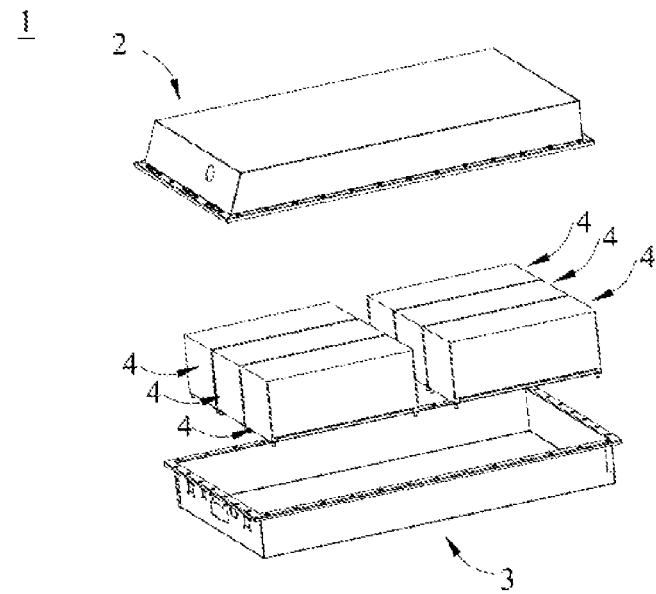
FIG. 7 is an exploded view of FIG. 6.

FIGS. 6 and 7 are the battery pack 1 as an example. Referring to FIGS. 6 and 7, the battery pack 1 may comprise a battery case and a plurality of battery modules 4 provided in the battery case. The battery case includes an upper case 2 and a lower case 3. The upper case 2 can be covered on the lower case 3 and forms a closed space for accommodating the battery module 4. Multiple battery modules 4 can be arranged in the battery box in any manner.

Apparatus

The present application further provides an apparatus comprising at least one of the secondary battery, battery module, or battery pack of the present application. The secondary battery, battery module or battery pack can be used as a power source of the apparatus, or can be used as an energy storage unit of the apparatus. The apparatus can be, but is not limited to, mobile apparatus (such as mobile phones, notebook computers), electric vehicles (such as pure electric vehicles, hybrid electric vehicles, plug-in hybrid electric vehicles, electric bicycles, electric scooters, electric golf carts, electric trucks), electric trains, ships and satellites, energy storage systems, etc. The secondary battery, the battery module, or the battery pack can be selected for the apparatus according to its usage requirements.

Figure 8:
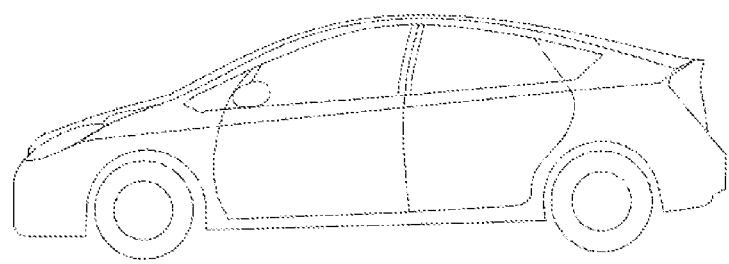
FIG. 8 is a schematic view showing an apparatus with a secondary battery as a power source according to an embodiment of the present application.

FIG. 8 is an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module can be used.

As another example, the apparatus may be a mobile phone, a tablet computer, a notebook computer, etc. The apparatus is generally required to be thin and light, and a secondary battery can be used as a power source.

Exemplary Embodiments

Embodiment 1. A negative active material comprising a core material and a polymer-modified coating layer on at least a part of its surface, wherein the core material comprises one or more of silicon-based material and tin-based materials; the coating layer comprises sulfur element and carbon element; in a Raman spectrum of the negative active material, the negative active material has scattering peaks at the Raman shifts of 900 $cm^{-1}$~960 $cm^{-1}$, 1300 $cm^{-1}$~1380 $cm^{-1}$ and 1520 $cm^{-1}$~1590 $cm^{-1}$, respectively, in which the scattering peak at the Raman shift of 900 $cm^{-1}$~960 $cm^{-1}$ has a peak intensity recorded as $I_f$, the scattering peak at the Raman shift of 1520 $cm^{-1}$~1590 $cm^{-1}$ has a peak intensity recorded as $I_G$, and $I_f$ and $I_G$ satisfy $0.2 \leq I_f/I_G \leq 0.8$.

Embodiment 2. The negative active material according to embodiment 1, wherein $I_f$ and $I_G$ satisfy $0.22 \leq I_f/I_G \leq 0.6$.

Embodiment 3. The negative active material according to embodiment 1 or 2, wherein the negative active material has a Raman spectrum comprising a scattering peak at the Raman shift of 1300 $cm^{-1}$~1380 $cm^{-1}$, in which the scattering peak at the Raman shift of 1300 $cm^{-1}$~1380 $cm^{-1}$ has a peak intensity recorded as $I_D$, and $I_D$ and $I_G$ satisfy $1.05 \leq I_D/I_G \leq 1.50$; optionally, $1.1 \leq I_D/I_G \leq 1.45$.

Embodiment 4. The negative active material according to any one of embodiments 1-3, wherein a full width at half maxima of the scattering peak at the Raman shift of 1300 $cm^{-1}$~1380 $cm^{-1}$ in the Raman spectrum of the negative active material is from 120 $cm^{-1}$ to 160 $cm^{-1}$, optionally from 128 $cm^{-1}$ to 152 $cm^{-1}$.

Embodiment 5. The negative active material according to any one of embodiments 1-4, wherein a mass percentage of the sulfur element in the negative active material is from 0.5% to 3%, optionally from 0.8% to 1.5%; and/or, a mass percentage of the carbon element in the negative active material is from 0.1% to 4%, optionally from 0.5% to 3%.

Embodiment 6. The negative active material according to any one of embodiments 1-5, wherein the negative active material has an X-ray diffraction pattern comprising a diffraction peak at the diffraction angle 2θ of 19° to 27° and the diffraction peak has a full width at half maxima of 4° to 12°, and optionally 5° to 10°.

Embodiment 7. The negative active material according to any one of embodiments 1-6, wherein the particle size distribution of the negative active material satisfies: $0.5 \leq (D_v90-D_v10)/D_v50 \leq 2.5$; optionally, $0.8 \leq (D_v90-D_v10)/D_v50 \leq 2.0$.

Embodiment 8. The negative active material according to any one of embodiments 1-7, wherein the negative active material has a volume average particle diameter $D_v50$ of from 2 μm-12 μm, optionally from 4 μm-8 μm, and/or the negative active material has a specific surface area of from 0.5 $m^2/g$ μm-5 $m^2/g$, optionally from 0.8 $m^2/g$ μm-3 $m^2/g$.

Embodiment 9. The negative active material according to any one of embodiments 1-8, wherein the negative active material has a tap density of 0.8 $g/cm^3$ to 1.3 $g/cm^3$, optionally 0.9 $g/cm^3$ to 1.2 $g/cm^3$; and/or the negative active material has a compacted density of 1.2 $g/cm^3$ to 1.5 $g/cm^3$ measured under a pressure of 5 tons (equivalent to 49 KN), optionally 1.25 $g/cm^3$ to 1.45 $g/cm^3$.

Embodiment 10. The negative active material according to any one of embodiments 1-9, wherein the silicon-based material is selected from one or more of elemental silicon, silicon-oxygen compounds, silicon-carbon composites, silicon-nitrogen compounds, and silicon alloys; optionally, the silicon-based material is selected from silicon-oxygen compounds;

the tin-based material is selected from one or more of elemental tin, tin oxide compounds, and tin alloys.

Embodiment 11. A method for preparing a negative active material, comprising the following steps:
providing a solution containing a polymer;
mixing a core material with the solution to obtain a mixed slurry, wherein the core material comprises one or more of silicon-based materials and tin-based materials;
drying the mixed slurry under an inert atmosphere to obtain a solid powder;
mixing the solid powder with sulfur powder and performing a heat treatment in an inert atmosphere to obtain a negative active material;
wherein the negative active material comprises a core material and a polymer-modified coating layer on at least a part of its surface; the coating layer comprises sulfur element and carbon element; in a Raman spectrum of the negative active material, the negative active material has scattering peaks at the Raman shifts of 900 $cm^{-1}$~960 $cm^{-1}$, 1300 $cm^{-1}$~1380 $cm^{-1}$ and 1520 $cm^{-1}$~1590 $cm^{-1}$, respectively, in which the scattering peak at the Raman shift of 900 $cm^{-1}$~960 $cm^{-1}$ has a peak intensity recorded as $I_I$, the scattering peak at the Raman shift of 1520 $cm^{-1}$~1590 $cm^{-1}$ has a peak intensity recorded as $I_G$, and $I_I$ and $I_G$ satisfy $0.2 \leq I_I/I_G \leq 0.8$.

Embodiment 12. The method according to embodiment 11, wherein the polymer comprises one or more of polyaniline, polyacetylene, polyacrylonitrile, polystyrene, polyvinyl chloride, and polyethylene.

Embodiment 13. The method according to embodiment 11 or 12, wherein, in the solution containing the polymer, the ratio of the mass of the polymer to the volume of the solvent is from 0.1 g/L to 10 g/L; optionally, the ratio of the mass of the polymer to the volume of the solvent is from 1 g/L to 5 g/L.

Embodiment 14. The method according to any one of embodiments 11-13, wherein a mass ratio of the core material to the polymer in the mixed slurry is from 10 to 200; optionally, the mass ratio of the core material to the polymer in the mixed slurry is from 20 to 100.

Embodiment 15. The method according to any one of embodiments 11-14, wherein the step of mixing the solid powder and the sulfur powder satisfies: the ratio of the mass of the sulfur powder to the mass of the polymer in the solid powder is from 1 to 5; optionally, the ratio of the mass of the sulfur powder to the mass of the polymer in the solid powder is from 2 to 4.

Embodiment 16. The method according to any one of embodiments 11-15, wherein the heat-treatment temperature is from 200° C. to 450° C.; optionally, the heat-treatment temperature is from 300° C. to 450° C.

Embodiment 17. The method according to embodiment 16, wherein the heat-treatment time is from 2 h to 8 h; optionally, the heat-treatment time is 3 h-5 h.

Embodiment 18. A secondary battery comprising the negative active material according to any one of embodiments 1-10 or the negative active material obtained by the method according to any one of embodiments 11-17.

Embodiment 19. A battery module, comprising the secondary battery according to embodiment 18.

Embodiment 20. A battery pack comprising the battery module according to embodiment 19.

Embodiment 21. An apparatus comprising at least one of the secondary battery according to embodiment 18, the battery module according to embodiment 19, or the battery pack according to embodiment 20.

EXAMPLE

The following examples are intended to describe the disclosure of the present application in more detail for only illustrative purpose, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Example 1

(1) Preparation of Negative Active Material 1 g of polyacrylonitrile was added into 1 L of dimethylformamide, and stirred until that all the polyacrylonitrile was dissolved, to obtain a solution.

100 g of silicon oxide (SiO) was added to the above solution and stirred to obtain a mixed slurry.

The mixed slurry was heated and dried in an argon atmosphere at 180° C. for 2 hours to obtain a solid powder.

2 g of sulfur powder (purity>99.9%) was weighted and mixed with the above solid powder, heated at 380° C. for 3 h in an argon atmosphere. After cooling the negative active material was obtained.

A button battery was used to test the capacity performance and cycle performance of the negative active material. The preparation of the button battery was as follows.

The negative active material prepared above and artificial graphite were mixed in a mass ratio of 3:7 to obtain a negative active substance. The resulting negative active substance, a conductive agent Super-P (conductive carbon black), a binder styrene-butadiene rubber (SBR) and sodium carboxymethyl cellulose (CMC-Na) were mixed and stirred at a mass ratio of 88:3:6:3 in an appropriate amount of deionized water to obtain a homogeneous negative electrode slurry; the negative electrode current collector copper foil was coated with the negative electrode slurry, following by drying, cold pressing and cutting, thereby obtaining a negative electrode plate, which can be used as a negative electrode plate of a secondary battery.

A lithium metal plate was used as an electrode, Celgard 2400 separator was used, and electrolytic solution was injected to assemble a button battery. In the electrolytic solution, ethylene carbonate (EC), ethyl methyl carbonate (EMC), and diethyl carbonate (DEC) were mixed uniformly in a volume ratio of 1:1:1 to obtain an organic solvent, and then $LiPF_6$ was dissolved in the above organic solvent. Then the additive fluoroethylene carbonate (FEC) was added, and in the electrolytic solution, the concentration of $LiPF_6$ was 1 mol/L, and the mass percentage of FEC in the electrolyte was 6%.

Examples 2 to 12 and Comparative Examples 1 to 4

The difference from Example 1 is that the relevant parameters in the preparation steps of the negative active material were adjusted, as shown in Table 1 for details.

Test Section

Test of Negative Active Material

1) Raman Spectroscopy Analysis

A LabRAM HR Evolution laser microscopic Raman spectrometer was used to determine the negative active material obtained from each of the examples and comparative examples, in which a solid-state laser with a wavelength of 523 nm was used as the light source, the beam diameter was 1.2 μm, and the power was 1 mW; macro Raman test mode was used and a CCD detector was used.

The negative active material powder was pressed into a tablet, 3 points were randomly selected on the tablet for testing, and the average value was taken.

2) Initial Coulombic Efficiency and Cycle Performance Test

Under a normal pressure environment at 25° C., a button battery was discharged at a constant current rate of 0.1 C to 0.005V, and then discharged at a constant current rate of 0.05 C to 0.005V. The resulting discharge capacity was recorded as the lithiation capacity at the first cycle. After that, the battery was charged to 1.5V at a constant current rate of 0.1 C. The resulting charge capacity was recorded as the delithiation capacity at the first cycle. The button battery was subjected to 50 charge and discharge cycles following the procedure described above, and the delithiation capacity for each cycle was recorded.

The initial coulombic efficiency of the negative active material (%)=the delithiation capacity at the first cycle/the lithiation capacity at the first cycle x 100%.

Cycle capacity retention rate of the negative active material (%)=the delithiation capacity at the $50^{th}$ cycle/the delithiation capacity at the first cycle×100%.

TABLE 1

Relevant preparation parameters for the negative active material

| No. | Polymer Type | Mass (g) | Solvent Type | Volume (L) | Sulfur powder Mass (g) | Drying Temperature (° C.) | Time (h) | Heat-treatment Temperature (° C.) | Time (h) |
|---|---|---|---|---|---|---|---|---|---|
| Example 1 | PAN | 1 | DMF | 1 | 2 | 180 | 2 | 380 | 3 |
| Example 2 | PAN | 1.5 | DMF | 1 | 2 | 185 | 2 | 400 | 2 |
| Example 3 | PAN | 2.5 | DMF | 1 | 4 | 200 | 2 | 400 | 3 |
| Example 4 | PAN | 3 | DMF | 1 | 6 | 205 | 2 | 430 | 2 |
| Example 5 | PAN | 3.5 | DMF | 1 | 7 | 210 | 2 | 430 | 2.5 |
| Example 6 | PAN | 4 | DMF | 1 | 8 | 215 | 2 | 430 | 3 |
| Example 7 | PAN | 5.5 | DMF | 1 | 11 | 225 | 2 | 450 | 3 |
| Example 8 | PAN | 6.5 | DMF | 1 | 13 | 235 | 2 | 450 | 4 |
| Example 9 | PANI | 3 | NMP | 1 | 9 | 230 | 2 | 450 | 3.5 |
| Example 10 | PANI | 3 | NMP | 1 | 9 | 230 | 2 | 450 | 3.5 |
| Example 11 | PE | 3 | DMB | 1 | 12 | 175 | 2 | 350 | 4.5 |
| Example 12 | PE | 3 | DMB | 1 | 12 | 175 | 2 | 350 | 4.5 |
| Comparative Example 1 | PAN | 3.5 | DMF | 1 | 0 | 190 | 2 | / | / |
| Comparative Example 2 | PAN | 3.5 | DMF | 1 | 0 | 190 | 2 | 1200 | 3 |
| Comparative Example 3 | PAN | 0.5 | DMF | 1 | 1 | 190 | 2 | 450 | 3 |
| Comparative Example 4 | PAN | 9 | DMF | 1 | 18 | 190 | 2 | 450 | 3 |

TABLE 2

Test results

| No. | $I_f/I_G$ | $I_D/I_G$ | $D_v50$ (μm) | Particle size distribution | Specific surface area (m²/g) | Initial coulombic efficiency (%) | Cycle capacity retention rate (%) |
|---|---|---|---|---|---|---|---|
| Example 1 | 0.20 | 1.07 | 5.9 | 1.39 | 2.71 | 78.9 | 92.1 |
| Example 2 | 0.22 | 1.12 | 6.0 | 1.26 | 2.70 | 80.1 | 94.4 |
| Example 3 | 0.25 | 1.20 | 5.9 | 1.48 | 2.71 | 80.7 | 96.0 |
| Example 4 | 0.30 | 1.25 | 6.1 | 1.21 | 2.69 | 81.9 | 96.8 |
| Example 5 | 0.35 | 1.30 | 6.1 | 1.20 | 2.69 | 82.8 | 97.1 |
| Example 6 | 0.42 | 1.39 | 6.2 | 1.18 | 2.67 | 81.5 | 95.8 |
| Example 7 | 0.53 | 1.45 | 6.3 | 1.16 | 2.68 | 80.6 | 95.2 |
| Example 8 | 0.59 | 1.50 | 6.4 | 1.02 | 2.68 | 79.3 | 93.5 |
| Example 9 | 0.72 | 1.06 | 4 | 1.97 | 3.16 | 77.1 | 90.8 |
| Example 10 | 0.78 | 1.32 | 7.7 | 1.05 | 1.07 | 78.6 | 91.3 |
| Example 11 | 0.64 | 1.33 | 2.7 | 2.21 | 4.98 | 76.3 | 90.2 |
| Example 12 | 0.68 | 1.25 | 5.9 | 1.37 | 2.57 | 78.5 | 91.6 |
| Comparative Example 1 | / | / | 6.0 | 1.20 | 2.67 | 71.9 | 92.1 |
| Comparative Example 2 | / | 1.27 | 6.1 | 1.22 | 2.70 | 72.5 | 91.8 |

TABLE 2-continued

Test results

| No. | $I_I/I_G$ | $I_D/I_G$ | $D_v50$ (μm) | Particle size distribution | Specific surface area (m²/g) | Initial coulombic efficiency (%) | Cycle capacity retention rate (%) |
|---|---|---|---|---|---|---|---|
| Comparative Example 3 | 0.18 | 1.15 | 5.9 | 1.35 | 2.70 | 70.7 | 90.1 |
| Comparative Example 4 | 0.96 | 1.29 | 6.9 | 0.89 | 2.61 | 70.1 | 89.5 |

In Table 2, $I_I$ was the peak intensity of the scattering peak at the Raman shift of 900 cm$^{-1}$~960 cm$^{-1}$ in the Raman spectrum of the negative active material;

$I_D$ was the peak intensity of the scattering peak at the Raman shift of 1300 cm$^{-1}$~1380 cm$^{-1}$ in the Raman spectrum of the negative active material;

$I_G$ was the peak intensity of the scattering peak at the Raman shift of 1520 cm$^{-1}$~1590 cm$^{-1}$ in the Raman spectrum of the negative active material;

the particle size distribution referred to (Dv90–Dv10)/Dv50.

It can be seen from the data in Table 2 that the negative active material of the present application comprised a core material and a polymer modified coating layer on at least a part of the surface, and in the Raman spectrum of the negative active material of the present application, the negative active material had scattering peaks at the Raman shifts of 900 cm$^{-1}$~960 cm$^{-1}$, 1300 cm$^{-1}$~1380 cm$^{-1}$, and 1520 cm$^{-1}$~1590 cm$^{-1}$, in which peak intensity $I_I$ of the scattering peak at the Raman shift of 900 cm$^{-1}$~960 cm$^{-1}$ and the peak intensity $I_G$ of the scattering peak at the Raman shift of 1520 cm$^{-1}$~1590 cm$^{-1}$ satisfied $0.2 \leq I_I/I_G \leq 0.8$, so that the negative active material of the present application had higher initial coulombic efficiency and cycle life. Especially, when the peak intensity $I_I$ of the scattering peak at the Raman shift of 900 cm$^{-1}$~960 cm$^{-1}$ and the peak intensity $I_G$ of the scattering peak at the Raman shift of 1520 cm$^{-1}$~1590 cm$^{-1}$ satisfied $0.22 \leq I_I/I_G \leq 0.6$, the initial coulombic efficiency and cycle life of the negative active material was further improved.

The use of the negative active material of the present application can improve the energy density, initial coulombic efficiency and cycle performance of the secondary battery.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A negative active material comprising a core material and a polymer-modified coating layer on at least a part of its surface, wherein the core material comprises one or more of silicon-based material and tin-based materials; the coating layer comprises sulfur element and carbon element; in a Raman spectrum of the negative active material, the negative active material has scattering peaks at the Raman shifts of 900 cm$^{-1}$~960 cm$^{-1}$, 1300 cm$^{-1}$~1380 cm$^{-1}$ and 1520 cm$^{-1}$~1590 cm$^{-1}$, respectively, in which the scattering peak at the Raman shift of 900 cm$^{-1}$~960 cm$^{-1}$ has a peak intensity recorded as $I_I$, the scattering peak at the Raman shift of 1520 cm$^{-1}$~1590 cm$^{-1}$ has a peak intensity recorded as $I_G$, and $I_I$ and $I_G$ satisfy $0.2 \leq I_I/I_G \leq 0.8$.

2. The negative active material according to claim 1, wherein $I_I$ and $I_G$ satisfy $0.22 \leq I_I/I_G \leq 0.6$.

3. The negative active material according to claim 1, wherein the negative active material has a Raman spectrum comprising a scattering peak at the Raman shift of 1300 cm$^{-1}$~1380 cm$^{-1}$, in which the scattering peak at the Raman shift of 1300 cm$^{-1}$!~1380 cm$^{-1}$! has a peak intensity recorded as $I_D$, and $I_D$ and $I_G$ satisfy $1.05 \leq I_D/I_G \leq 1.50$.

4. The negative active material according to claim 1, wherein a full width at half maxima of the scattering peak at the Raman shift of 1300 cm$^{-1}$~1380 cm$^{-1}$ in the Raman spectrum of the negative active material is from 120 cm$^{-1}$ to 160 cm$^{-1}$.

5. The negative active material according to claim 1, wherein a mass percentage of the sulfur element in the negative active material is from 0.5% to 3%; and/or, a mass percentage of the carbon element in the negative active material is from 0.1% to 4%.

6. The negative active material according to claim 1, wherein the negative active material has an X-ray diffraction pattern comprising a diffraction peak at the diffraction angle 2 8 of 19° to 27° and the diffraction peak has a full width at half maxima of 4° to 12°.

7. The negative active material according to claim 1, wherein the particle size distribution of the negative active material satisfies: $0.5 \leq (D_v90-D_v10)/D_v50 \leq 2.5$.

8. The negative active material according to claim 1, wherein the negative active material has a volume average particle diameter $D_v50$ of from 2 μm-12 μm, and/or the negative active material has a specific surface area of from 0.5 m²/g-5 m²/g.

9. The negative active material according to claim 1, wherein the negative active material has a tap density of 0.8 g/cm³ to 1.3 g/cm³; and/or the negative active material has a compacted density of 1.2 g/cm³ to 1.5 g/cm³ measured under a pressure of 5 tons (equivalent to 49 KN).

10. The negative active material according to claim 1, wherein the silicon-based material is selected from one or more of elemental silicon, silicon-oxygen compounds, silicon-carbon composites, silicon-nitrogen compounds, and silicon alloys; optionally, the silicon-based material is selected from silicon-oxygen compounds;

the tin-based material is selected from one or more of elemental tin, tin oxide compounds, and tin alloys.

11. A method for preparing the negative active material according to claim 1, comprising the following steps:
   providing a solution containing a polymer;
   mixing a core material with the solution to obtain a mixed slurry, wherein the core material comprises one or more of silicon-based materials and tin-based materials;
   drying the mixed slurry under an inert atmosphere to obtain a solid powder;
   mixing the solid powder with sulfur powder and performing a heat treatment in an inert atmosphere to obtain a negative active material.

12. The method according to claim 11, wherein the polymer comprises one or more of polyaniline, polyacetylene, polyacrylonitrile, polystyrene, polyvinyl chloride, and polyethylene.

13. The method according to claim 11, wherein, in the solution containing the polymer, the ratio of the mass of the polymer to the volume of the solvent is from 0.1 g/L to 10 g/L.

14. The method according to claim 11, wherein a mass ratio of the core material to the polymer in the mixed slurry is from 10 to 200.

15. The method according to claim 11, wherein the step of mixing the solid powder and the sulfur powder satisfies: the ratio of the mass of the sulfur powder to the mass of the polymer in the solid powder is from 1 to 5.

16. The method according to claim 11, wherein the heat-treatment temperature is from 200° C. to 450° C.

17. The method according to claim 16, wherein the heat-treatment time is from 2 h to 8 h.

18. A secondary battery comprising the negative active material according to claim 1.

* * * * *